Aug. 23, 1949.     H. M. REEVES     2,480,045
COOKSTOVE
Filed May 18, 1945     4 Sheets-Sheet 1
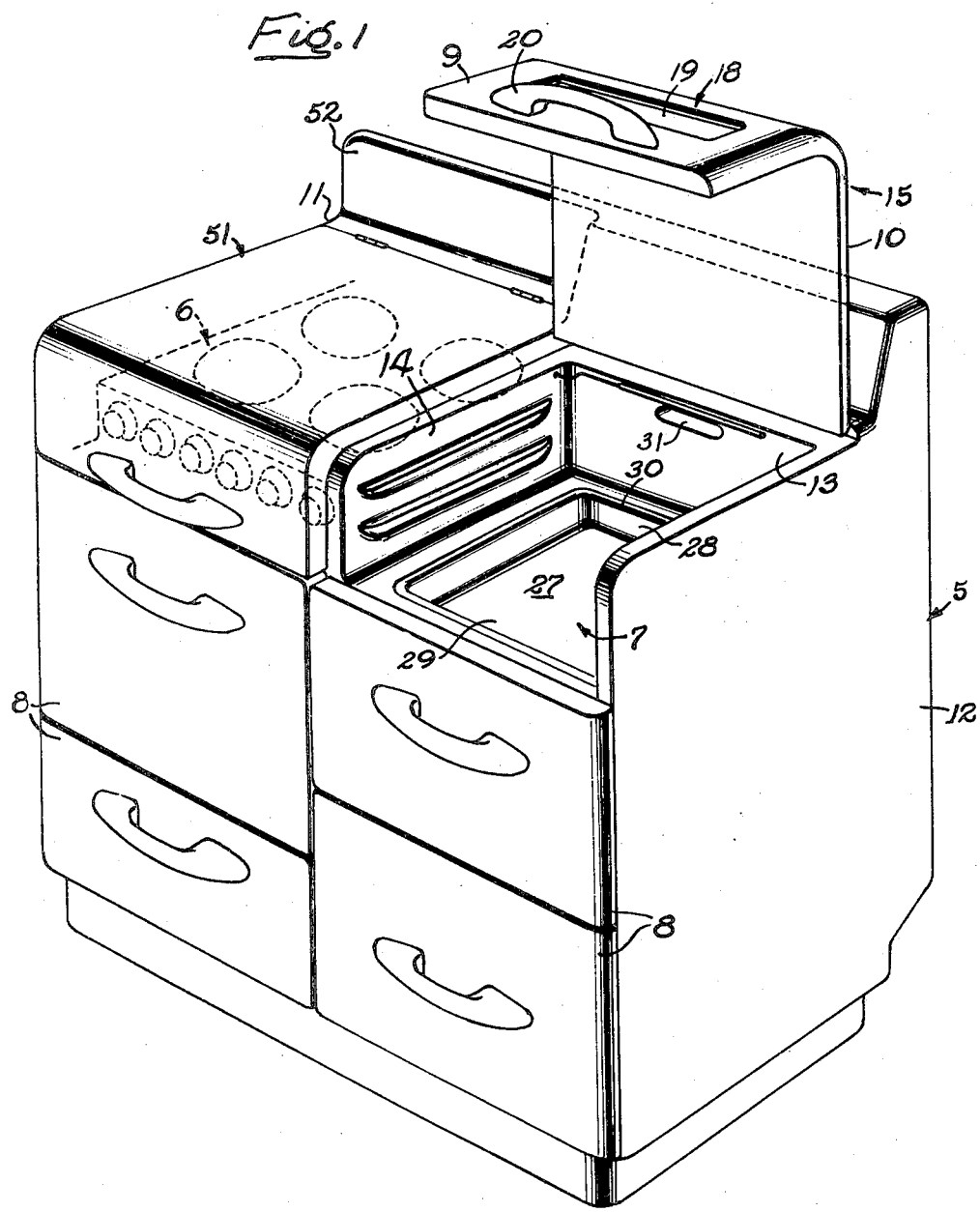
INVENTOR
Herbert M. Reeves
ATTORNEYS

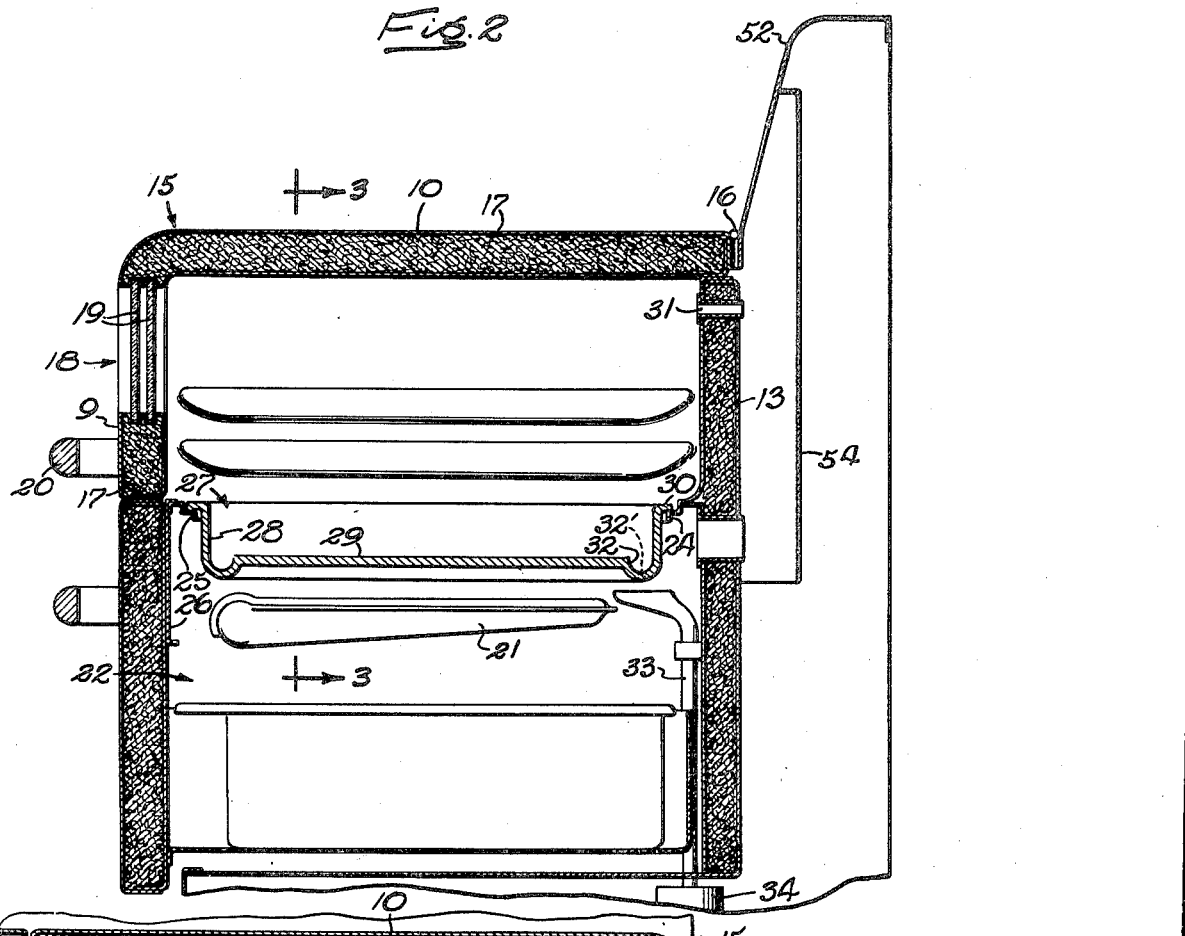
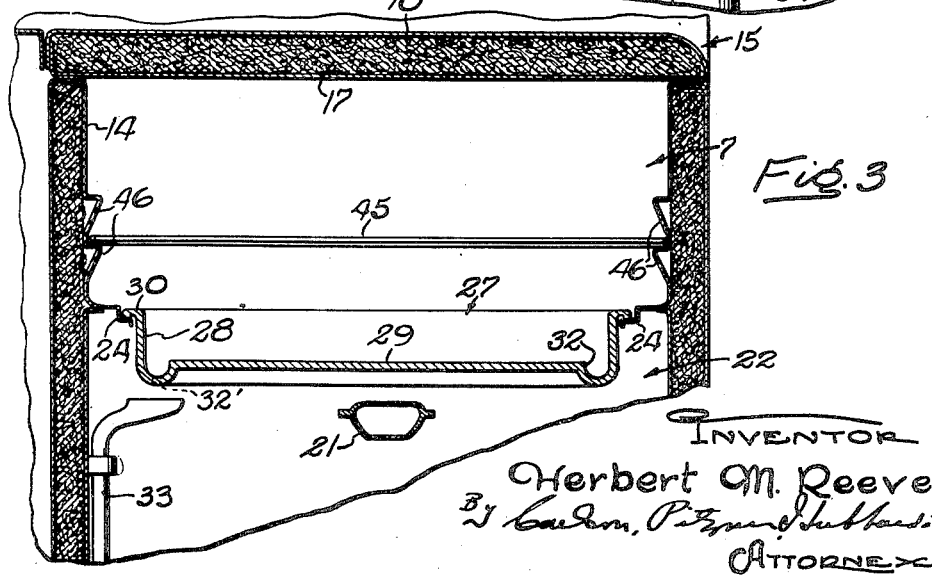

Aug. 23, 1949.   H. M. REEVES   2,480,045
COOKSTOVE
Filed May 18, 1945   4 Sheets-Sheet 3
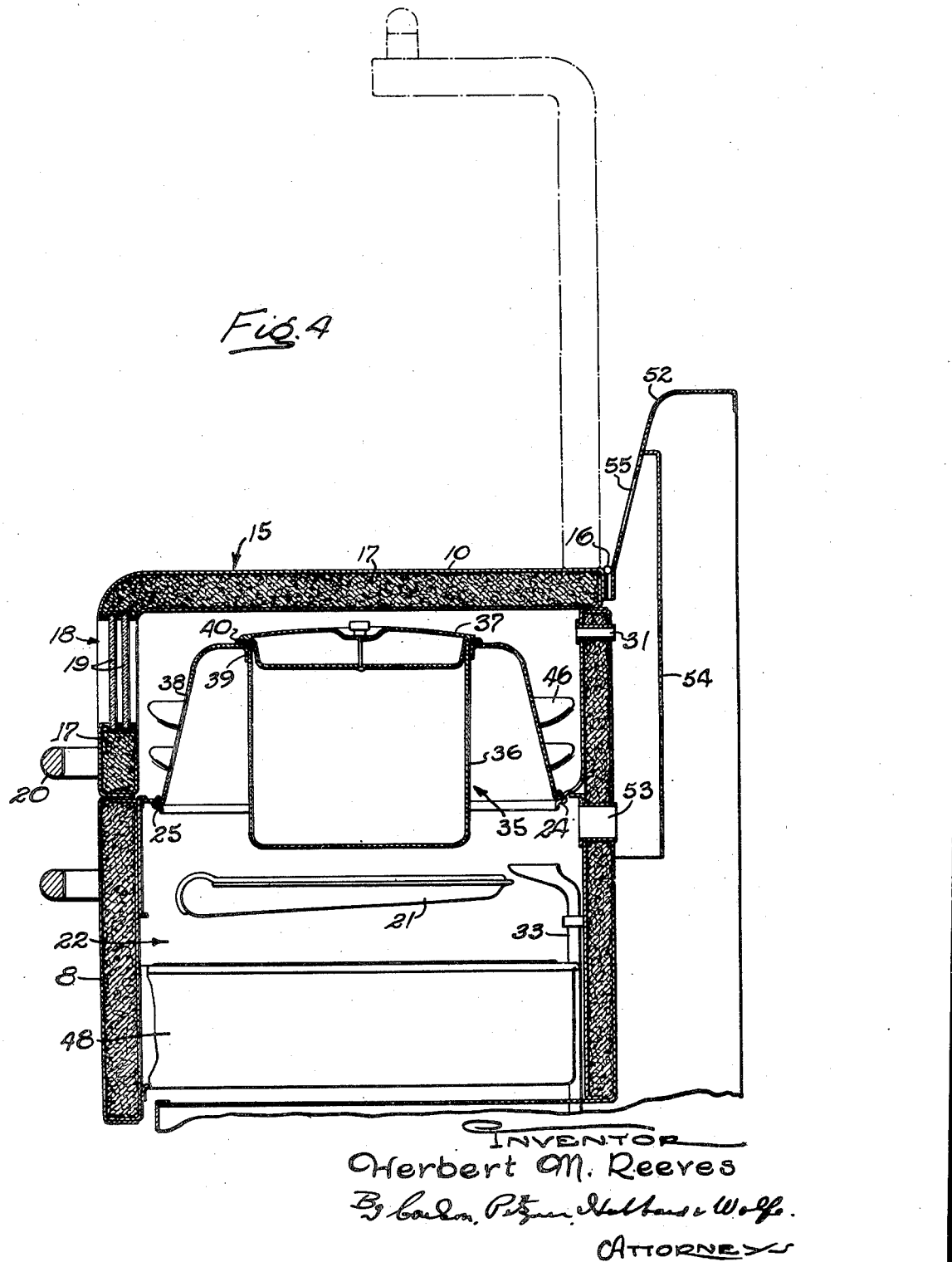
INVENTOR
Herbert M. Reeves
ATTORNEYS

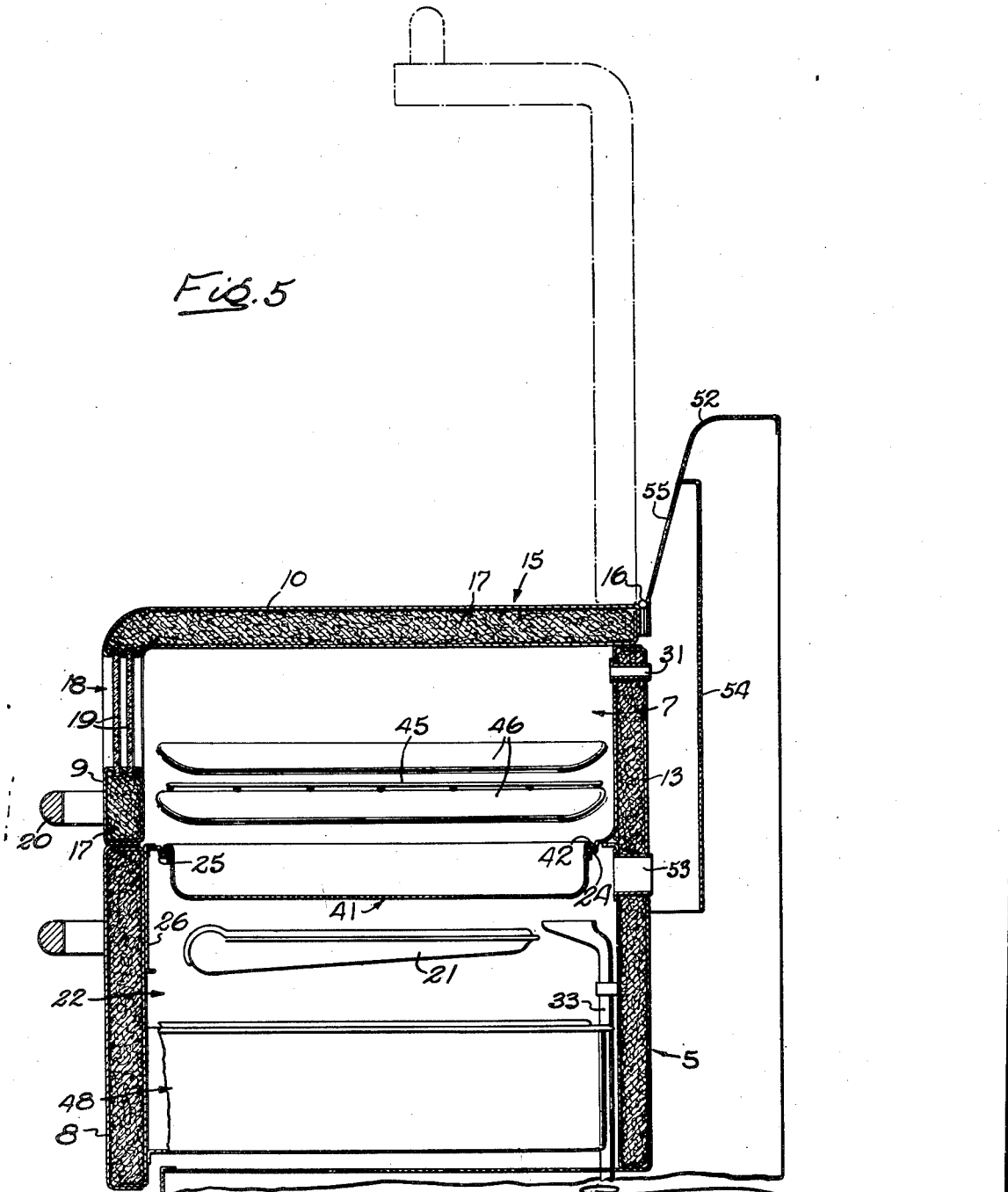

Patented Aug. 23, 1949

2,480,045

UNITED STATES PATENT OFFICE 2,480,045

COOKSTOVE

Herbert M. Reeves, Kankakee, Ill., assignor to Florence Stove Company, Gardner, Mass., a corporation of Massachusetts Application May 18, 1945, Serial No. 594,482

3 Claims. (Cl. 126—39)

The invention relates to cookstoves and has for its primary object the provision of an improved stove having an oven compartment adapted for the efficient performance of a wider variety of cooking processes than has been practicable with stoves as heretofore constructed.

A more specific object is to provide an oven construction adapted to accommodate a wide variety of interchangeable accessories such as a griddle, a roasting pan or a deep well cooker thereby greatly increasing the range of usefulness of the stove.

Another object is to organize the parts of the stove in a novel and advantageous manner so as to provide convenient access to the oven compartment both from the front and from the top of the stove.

Still another object is to provide an improved cookstove in which the bottom of the oven compartment is formed by a removable element adapted to function as a cooking utensil and readily interchangeable with other such elements.

A further objecet is to provide a cookstove having superimposed broiling and baking ovens heated by a common burner in which the partition between the ovens is in the form of a removable element disposed above the burner.

Other objects and advantages of the invention will become apparent from the following detailed description of the preferred embodiment illustrated in the accompanying drawings in which:

Figure 1 is a perspective view of a cookstove embodying the features of the invention.

Fig. 2 is a transverse sectional view of the stove taken in a vertical plane substantially through the center of the oven compartment and showing the latter equipped with a griddle.

Fig. 3 is a sectional view taken in a vertical plane substantially on the line 3—3 of Fig. 2.

Fig. 4 is a sectional view similar to Fig. 2 showing the oven compartment equipped with a deep well cooker.

Fig. 5 is a fragmentary sectional view taken in the same plane as Fig. 2 but showing the oven compartment equipped with a roasting pan.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

Referring to Fig. 1 of the drawings, the improved cookstove comprises generally a rectangular body 5 having a cooking top 6 at one side and an oven compartment 7 at the other side. The body 5 is also provided with a plurality of compartments fitted with panel type closure elements 8 which may be in the form of hinged doors or drawer fronts.

In accordance with the invention, the improved cookstove is constructed and arranged in a novel manner to provide access to the oven compartment 7 both from the front and the top whereby to adapt it for various cooking processes that ordinarily cannot be performed in conventional front opening ovens. More particularly, the improved stove is constructed to provide front and top walls 9 and 10 which are movable as a unit to a retracted position in which the oven is completely opened at the front and at the top. In order that the various cooking processes may be performed with maximum efficiency, the oven compartment 7 is also constructed and arranged for the accommodation of a variety of interchangeable accessories each designed for the efficient performance of a particular cooking process.

In the exemplary cookstove, the body 5 is constructed with end walls 11 and 12 and a back wall 13 (Fig. 2) in the form of double-walled insulated panels. A vertical partitioning member 14 also in the form of a double-walled insulated panel cooperates with the end wall 12 and the back wall 13 to form the fixed side and back walls of the oven compartment 7. The movable front and top walls 9 and 10 of the oven compartment 7 are preferably made rigid to form a generally L-shaped unit or cover 15 adapted to extend over the front and top edges of the side wall panels 12 and 14 forming the oven compartment. Moreover, the front wall member 9 of the cover is constructed so as to lie flush with the front surfaces of the closure members 8 thus presenting a smooth surface at the front of the stove. In the particular stove illustrated, the top wall portion 10 of the cover is secured at its rear edge to the stove body 5 by means of hinges 16 so that it may swing between the closed position shown in Fig. 2 and the open position shown in Fig. 1.

Referring more in detail to the drawings, the cover 15, as herein shown, is constructed of spaced inner and outer sheet metal shells secured together in any suitable manner and having the intervening space filled with insulating material 17. The top wall portion 10 of the cover is thus maintained at a sufficiently low temperature so that it may be used as a working surface when the oven is in operation. The front wall portion 9 of the cover 15 is also insulated and is preferably provided with a window opening 18 closed by spaced glass panes 19 through which the contents of the oven may be inspected. A handle 20 at the front of the cover is provided for convenience in opening and closing the same.

To accommodate a variety of accessories for different cooking processes, the oven compartment 7 is constructed without a fixed bottom and provision is made for removably supporting individual accessories directly over a burner 21 (Figs. 2 and 3) disposed below the oven compartment. The burner 21 is conveniently employed for heating a broiling oven 22 located immediately below the oven 7 and partitioned therefrom by the accessories as will appear presently.

Support for the accessories is provided, in this instance, by inwardly projecting flanges 24 on the side and back walls of the oven and a similar inwardly projecting flange 25 extending across the front of the oven. The flanges 24 may be formed directly on the inner walls of the panels 12, 13 and 14 as shown in Figs. 2 and 3 while the flange 25 is preferably formed as a separate metal strip and is rigidly secured as by spot welding to a cross member 26 constituting a part of the framework of the stove body.

As the oven compartment is accessible both from the front and from the top, it is particularly well adapted for the accommodation of a griddle 27. As shown in Figs. 2 and 3 of the drawings, the griddle 27 comprises a relatively shallow, generally rectangular pan of cast aluminum or other suitable material having substantially vertical side walls 28 and a horizontal bottom 29 providing a flat cooking surface of substantial area. For supporting the griddle, the side walls 28 are provided at their upper edges with outturned flanges 30 adapted to rest on the flanges 24 and 25 of the oven structure.

As will be seen by reference to Fig. 2 of the drawings, the flanges 24 and 25 are located so that the bottom of the griddle is positioned above but in close proximity to the burner 21. Preferably these flanges and the interengaging flanges 30 of the griddle are formed so as to provide a relatively tight joint effective to exclude products of combustion from the oven compartment. A vent opening 31 in the back wall 13 serves as an outlet for the vapors formed in the oven.

In the exemplary embodiment shown, the griddle 27 is constructed with a depressed groove or grease receiving channel 32 extending around the bottom 29 adjacent the side walls 28. Grease or other liquids collected in the channel are drained through a suitable outlet 32' arranged above the open end of a funnel-like drain pipe 33 supported on the framework of the stove in any suitable manner. The drain pipe may be arranged to direct the collected liquids into a suitable receptacle 34.

The top opening of the oven compartment also adapts it for the accommodation of a deep well cooker 35 which, as shown in Fig. 4, comprises a relatively deep cylindrical pan or kettle 36 fitted with a tight cover 37, preferably insulated to minimize heat losses therethrough. Support for the kettle 36 is provided by a sheet metal supporting member adapted to rest on flanges 24 and 25 of the oven structure and having an upwardly extending frusto-conical central portion 38 turned inwardly at the top and an opening 39 dimensioned to receive the kettle. Preferably the latter is provided at its open end with an outturned flange 40 adapted to engage and rest upon the upper end of the member 38. Thus when desired, the kettle 36 may be removed from the oven without disturbing the supporting structure.

Since the oven compartment 7 may be completely closed by the cover 15, it is usable for the cooking processes such as baking, roasting, etc. ordinarily performed in conventional ovens. For such processes, the compartment may be equipped with a pan-like accessory 41 (Fig. 5) which forms the bottom of the oven and additionally serves as a cooking utensil such as a roasting pan. The pan 41 is preferably constructed of enameled sheet metal and, like the accessories described heretofore, is generally rectangular in form. Support for the pan is provided by an outturned flange 42 adapted to rest on the flanges 24 and 25 of the oven structure.

The oven compartment 7 may also be arranged to accommodate conventional oven racks such as the wire rack 45 shown in Fig. 3 for supporting pans or the like in an elevated position within the oven. For this purpose, the panels 12 and 14 at the sides of the oven are formed with inwardly projecting horizontally disposed ridges 46 having their upper edges located in the same horizontal plane. The rack is removed of course, when the griddle or deep well cooker is to be used.

The provision of the broiling oven 22 below the oven 7 enables the oven burner 21 to be used for broiling in addition to the cooking processes performed in the oven compartment 7. The broiling oven 22 is completely closed off from the oven 7 by the oven accessory in use and, as herein shown, is equipped with a sliding drawer 48 which may be of any suitable construction. One of the closure panels 8 forms the front member of the drawer.

The body 5 of the exemplary stove is also constructed so that the cooking top 6 is disposed within a compartment formed by the side panels 11 and 14 and adapted to be closed by a hinged cover 51 similar to the cover 15. Preferably the cover 51 is constructed so that its front surface is flush with the front wall member 9 of the cover 15 and with the closures 8 for the various stove compartments. Further the top surface of the cover 51 is arranged to lie flush with the top surface of the cover 15 when both are closed thus presenting a flat surface adapted to be used as a table top.

As will be seen by reference to the drawings, the stove body 5 is provided at its rear edge with an upright splasher plate or backguard 52. At the rear of the oven compartment 7, the backguard is increased substantially in depth to accommodate a timer, temperature control apparatus or other auxiliary equipment commonly provided in connection with ovens. The deeper section of the backguard also serves to accommodate a flue box 54 (Figs. 2 and 4) in communication with the oven vent 31 and with a vent opening 53 for the broiling oven 22. As shown, the flue is arranged to discharge through suitable openings 55 in the face of the backguard.

It will be apparent from the foregoing that the invention provides a cookstove of novel and advantageous construction adapted for the performance of a wide variety of cooking processes. In particular, the provision of an oven compartment accessible both from the front and from the top of the stove permits it to be used for cooking processes that cannot be carried out in conventional ovens. Moreover, the improved construction enables the oven to accommodate a wide variety of interchangeable accessories so that the stove may be quickly and easily adapted for the most efficient performance of any selected cooking process. The increased utility of the improved cookstove is obtained without substantial increase in size and without sacrifice of any of the desirable features commonly found in table type stoves.

I claim as my invention:

1. In a cookstove, in combination, a stove body having a generally rectangular oven compartment, a burner disposed below said compartment, an inwardly projecting flange extending around the inner walls of said compartment above said burner, a sheet metal member supported on said flange having a frusto-conical portion extending upwardly from the plane of said flange, said frusto-conical portion having an opening in its upper end, a deep well cooking utensil disposed in said opening and supported by said frusto-conical portion, and a closure for said compartment providing access to said utensil from the top of the compartment.

2. In a cookstove, in combination, fixed side and back walls defining a generally rectangular compartment open at the front and top, means providing a rest intermediate the top and bottom of the compartment, a burner in said compartment disposed below and closely adjacent said rest, a member supported on said rest having an upwardly extending portion formed with an opening at the top adapted to receive a deep well cooking utensil and to support the same above said burner, and a cover for said compartment including two angularly related panels dimensioned respectively to form walls for the top of the compartment and for the front of the compartment, said front panel being divided adjacent said rest to permit the upper portion and the associated upper panel to be moved to an open position providing access to said utensil from the front and from the top of the compartment.

3. A cookstove having an oven section comprising insulated side and rear walls and providing a lower broiling oven with a front opening, and an upper baking or roasting oven having a bottom wall with an opening therein, said upper oven opening upwardly and forwardly and having an insulated top cover of L-shape coacting with the upper portions of said side and rear walls to complete the upper oven, a cooking utensil removably supported upon the bottom wall of the upper oven at the edge of the opening therein, and a burner in the upper portion of the broiler oven, said cooking utensil having a portion depending through the opening and providing a bottom wall spaced a short distance above said burner so as to be heated thereby.

HERBERT M. REEVES.

REFERENCES CITED

The following references are of record in the file of this patent:

UNITED STATES PATENTS

| Number | Name | Date |
| --- | --- | --- |
| 843,643 | VanWie | Feb. 12, 1907 |
| 1,088,849 | Syvertsen | Mar. 3, 1914 |
| 1,526,775 | Cuffe | Feb. 17, 1925 |
| 1,708,469 | Claus | Apr. 9, 1929 |
| 1,784,764 | Stockstrom et al. | Dec. 9, 1930 |
| 1,801,640 | Reedy | Apr. 21, 1931 |
| 2,325,773 | Hennessy | Aug. 3, 1943 |

FOREIGN PATENTS

| Number | Country | Date |
| --- | --- | --- |
| 368,053 | Germany | Jan. 30, 1923 |
| 406,585 | Germany | Nov. 25, 1924 |
| 524,276 | France | May 10, 1921 |